United States Patent

Harmon

[11] 3,767,120
[45] Oct. 23, 1973

[54] EXIT AREA SCHEDULE SELECTOR SYSTEM

[75] Inventor: Kenneth E. Harmon, Riviera Beach, Fla.

[73] Assignee: United Aircraft Corporation, East Hartford, Conn.

[22] Filed: Dec. 20, 1971

[21] Appl. No.: 209,803

[52] U.S. Cl. ............................................. 239/265.39
[51] Int. Cl. ............................................. B64c 15/08
[58] Field of Search ................. 239/265.33, 265.37, 239/265.39; 60/242

[56] References Cited
UNITED STATES PATENTS
3,454,227 7/1969 Motycka ..................... 239/265.39
3,564,934 2/1971 McMurtry ................. 239/265.39 X FOREIGN PATENTS OR APPLICATIONS
851,085 10/1960 Great Britain ............... 239/265.39

Primary Examiner—M. Henson Wood, Jr.
Assistant Examiner—Michael Mar
Attorney—Jack N. McCarthy

[57] ABSTRACT

A nozzle having four sets of flaps is formed on the exhaust end of a turbojet engine. One set of main flaps is pivotally located downstream of an exhaust opening with a second set of balance flaps pivotally connected between said main flaps and the rear end of the engine. A third set of diverging flaps are pivotally mounted to the main flaps and extend downstream thereof with the downstream end of said diverging flaps being pivotally connected at their rearward end to a fourth set of external flaps which are pivotally mounted at their forward end to fixed structure with actuating means for translating the pivotal mounting to variably position the forward end of the external flaps. The actuating means comprises a bell crank for each external flap having one arm connected to the flap and one arm having a gear segment thereon which engages a worm gear to pivot the bell crank. All of the worm gears are mounted on shafts and the shafts are interconnected by shaft sections to move them all together, and spline connections are included on the spline sections for thermal growth. An actuating device rotates one shaft section to rotate the entire set of shafts and shaft sections.

The invention disclosed herein was made in the course of or under a contract with the Department of the Air Force.

8 Claims, 6 Drawing Figures

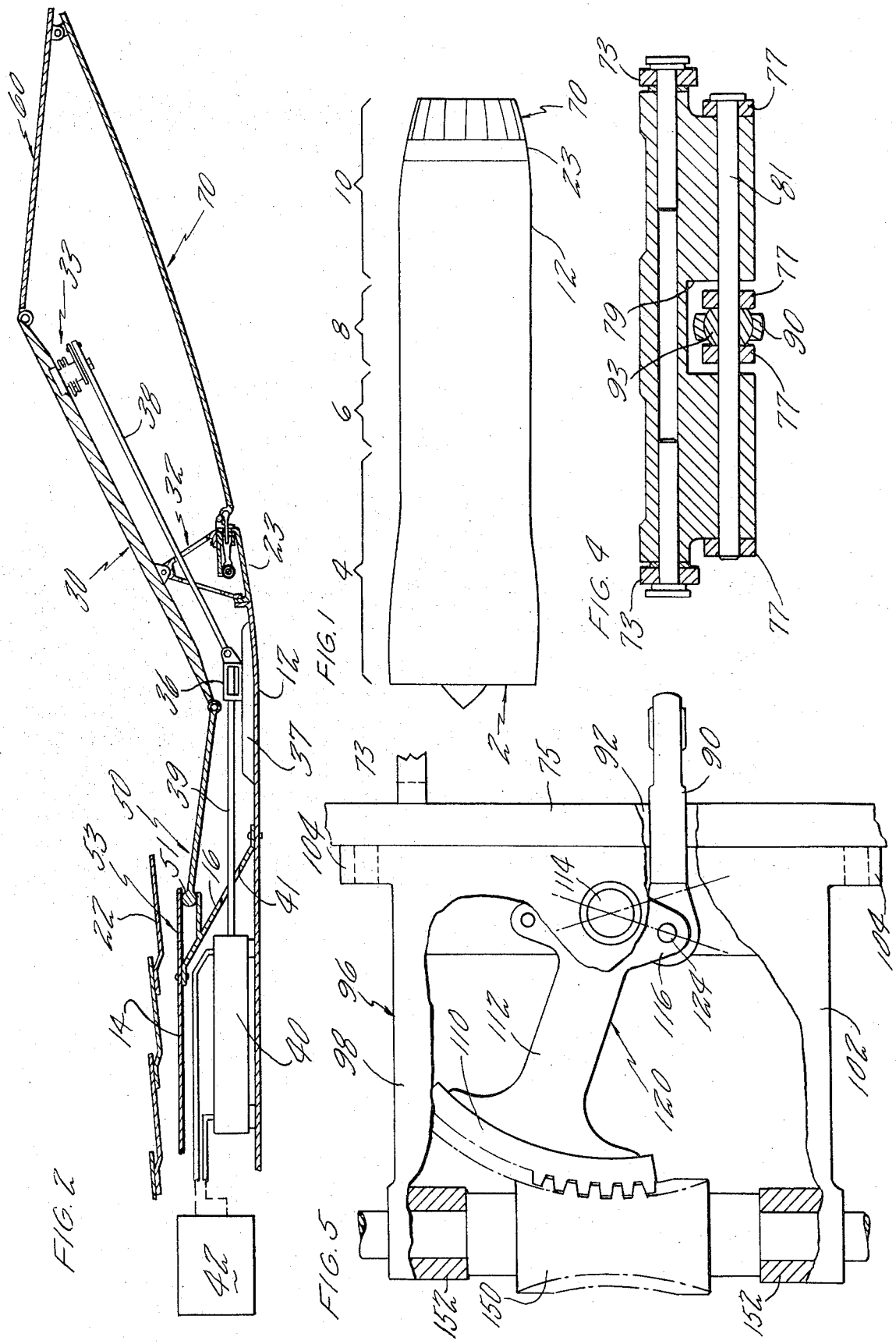

3,767,120

EXIT AREA SCHEDULE SELECTOR SYSTEM

BACKGROUND OF THE INVENTION

This invention relates to variable area nozzles for turbojet engines and their control. While many nozzles are shown in the prior art, none appear to provide the cooperating movement between diverging and external flaps to provide means for varying the ratio between the throat area and exit area of the nozzle.

SUMMARY OF THE INVENTION

A primary object of the present invention is to provide an actuation system for positively moving the divergent nozzle flaps to vary the ratio between the throat area and exit area.

In accordance with the present invention, the divergent flaps are retained in a preselected position after they are varied to eliminate any possibility of flap flutter.

An actuating means is provided having a single power input which actuates a plurality of outputs to each flap, the actuating device being self-locking.

Another object of the present invention is to provide a nozzle system wherein the exit area is changed by translating the forward pivotal hinge point of the external flaps while maintaining the throat area constant.

A further object of the invention is to provide for synchronization of the movement of the external flaps so that the area is changed in a symmetrical manner.

BRIEF DESCRIPTION OF THE DRAWINGS

FIG. 1 is a view illustrating the application of the invention to a turbojet engine.

FIG. 2 is an enlarged schematic view taken through the nozzle and the rear portion of the engine showing the minimum area position of the flaps of the nozzle.

FIG. 4 is a view taken along the line 4—4 of FIG. 3.

FIG. 5 is a view taken along the line 5—5 of FIG. 3 with the flap support bracket removed.

DESCRIPTION OF THE PREFERRED EMBODIMENT

Figure 3:
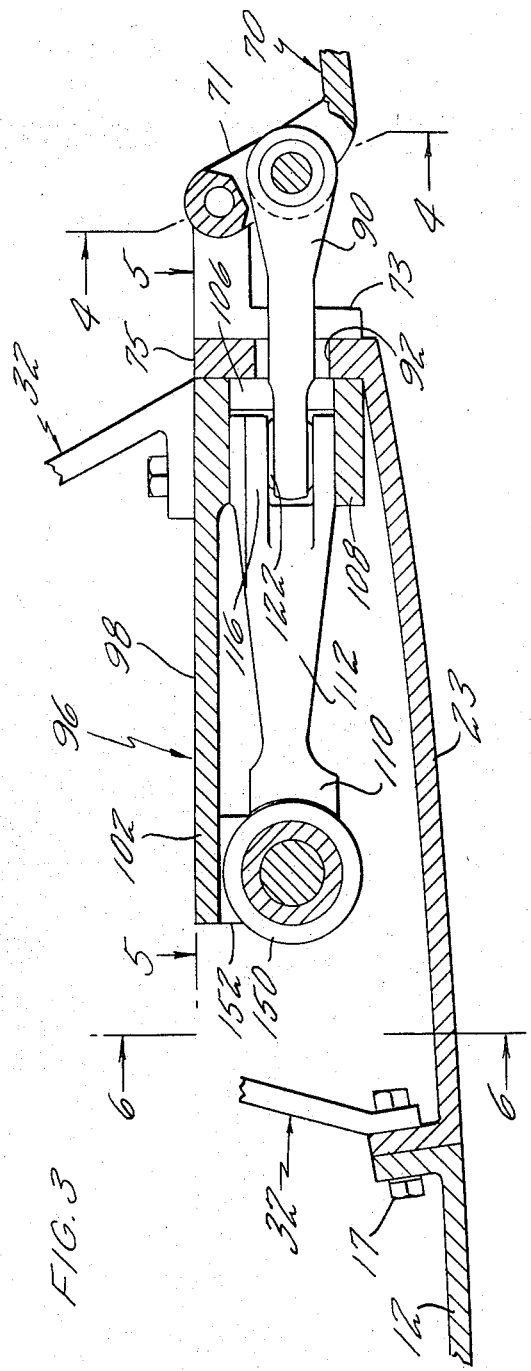
FIG. 3 is an enlarged view of the actuating means for each pair of diverging and external flaps shown in FIG. 2.
Figure 6:
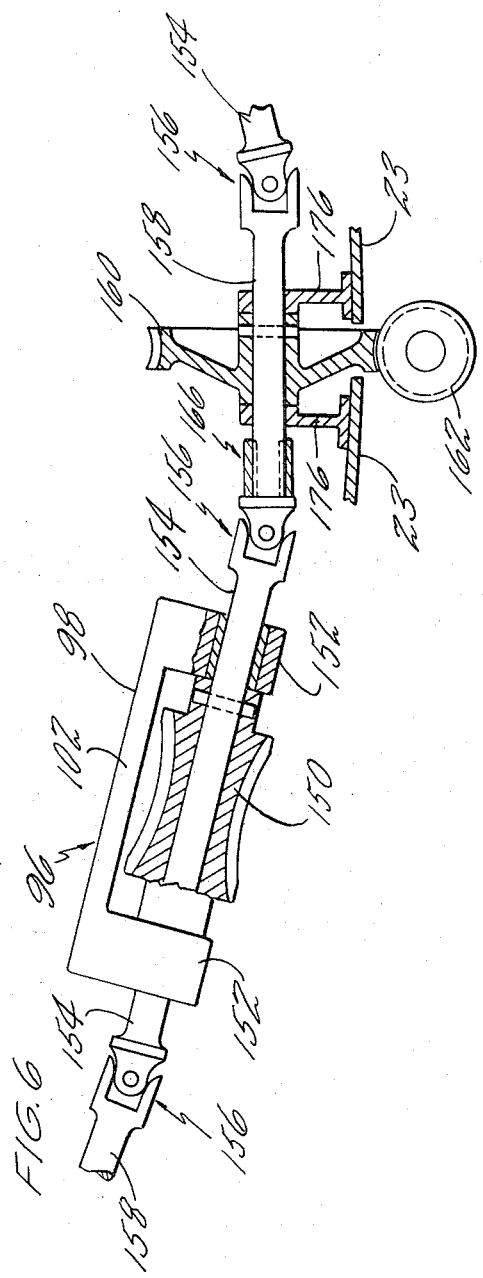
FIG. 6 is a view taken along the line 6—6 of FIG. 3 showing the drive means for each of the pair of diverging and external flaps.

Referring to FIG. 1, the engine 2 shown includes a conventional compressor section 4, the burner section 6, turbine section 8 and exhaust duct and nozzle 10. In FIG. 2, an inner case 14 is shown fixed to the outer housing structure 12 by a conical shaped connecting member 16. This member 16 is attached to the outer housing and inner case by any means desired. An inner liner 22 is positioned around and fixedly spaced from the inner side of inner case 14. An annular extension 23 is fixed to the rear end of the structure 12. In the construction shown an inwardly projecting annular flange on the forward end is fixedly connected to an inwardly projecting annular flange at the rear end of the housing 12 by bolts 17.

A plurality of main flaps 30 are mounted for pivotal movement at the rear end of the outer housing structure 12. These flaps are each pivotally mounted on a bracket member 32 which extends inwardly from the annular extension 23. Each flap 30 is pivotally mounted approximately one-third of the distance from its forward edge and each pivotal mounting is substantially in axial alignment with the inner liner 22. Each main flap 30 has an actuating device 33 mounted thereon which is connected to each adjacent flap so that when all of the actuating devices 33 are moved, all of the main flaps are actuated in a synchronized movement. This actuating device is disclosed in co-pending application Ser. No. 209,664, Filed Dec. 20, 1971, for Synchronized Exhaust Nozzle Actuating System by William M. Madden et al. While one actuating means has been shown, it is to be understood that many other actuating means can be used. Another means is shown in co-pending application Ser. No. 209,665, Filed Dec. 20, 1971 for Balanced Flap Converging/Diverging Nozzle by Craig E. Swavely et al.

Each actuating device 33 is connected to a unison ring 36 by a connecting link 38. A plurality of actuating cylinder and piston units 40 are mounted in the space between the housing structure 12 and the inner case 14 in front of the connecting member 16. An actuating rod 39 extends from each of the cylinder and piston units 40 and is attached to the unison ring 36. The unison ring 36 is centered within and slides on track members 37. Each actuating rod 39 extends through an opening 41 in the connecting member 16. A nozzle actuator 42 connects one side of the cylinder and piston unit to an actuating pressure while opening the opposite side to drain thereby movably positioning the main flaps 30. An arrangement of this type is shown in U.S. Pat. No. 2,815,643.

A plurality of balance flaps 50 extend forwardly of the main flaps 30. Each flap 50 has its rearward end pivotally connected to the forward end of a main flap 30 while its forward end has cylindrical means 51 thereon which is mounted for axial movement in a track means 53. Each track means 53 is formed between a rearward extension of the inner case 14 and a rearward extending flange 15 on the connecting member 16. While a simple connection has been shown, any type of arrangement permitting axial movement along with a change in angular position of the balance flap 50 can be used.

A plurality of divergent flaps 60 extend rearwardly of the main flaps 30. Each flap 60 has its forward end pivotally connected to the rearward end of a main flap 30 while its rearward end is pivotally connected to the rear end of an external flap 70. Each external flap 70 has its forward end pivotally mounted through a guide link 71 to the rear end of the annular extension 23, just rearwardly of the bracket members 32. Each guide link 71 is pivotally mounted at its inner end between two brackets 73 which are fixed to an inwardly projecting flange 75 at the rear of the extension 23. Each guide link 71 is pivoted at its outer end to the external flaps 70. Each flap 70 has four forwardly projecting bosses 77 which cooperate with guide link 71. Two of the bosses 77 engage the opposite ends of the link while two inner bosses are spaced apart and project into a cut-out section 79 in the link. A shaft 81 extends through the bosses 77 engaging the parts of the link 71 between the inner and outer bosses 77.

An actuating link 90 extends through an opening 92 in the flange 75 to actuate the guide link 71 and move the flap 70 and therefore flap 69, to change the ratio between the throat area and the exit area of the nozzle. This actuating link 90 is connected to the guide link 71 through a ball 93 which is mounted on shaft 81 between the two inner bosses 77. This arrangement provides for a ball joint action between the actuating link 90 and guide link 71.

Each actuating link 90 has an actuating device 96 connected to the forward side of annular flange 75. This actuating device 96 consists of a support member 98 which includes an inner plate 102 which is fixed to the inner side of the flange 75 by the means of flanges 104. These flanges 104 can be fixed by any means desired, such as by bolts. The rear part of the support member 98 has an outwardly extending flange 106 at each side thereof which supports a short outer plate 108.

A gear segment 110 is fixed to an arm 112 which is pivoted for rotation on a pin 114 which is fixedly mounted between the rearward part of the inner plate 102 and plate 108. An arm 116 extends at an angle of approximately 90° to the arm 112 providing a bell crank 120. The arm 116 is bifurcated and receives the forward end of the actuating link 90 between the two parts thereof. This actuating link 90 is connected to the arm 116 through a ball 122 which is mounted on a short shaft 124 extending between the two parts of the arm. This arrangement provides for a ball joint action between the actuating link 90 and the arm 116 of the bell crank lever 120.

A worm gear 150 is mounted between projections 152 which depend outwardly from each side of the inner plate 102 on a shaft 154. Each end of the shaft 154 has one part of spherical joint connection 156 for a purpose to be hereinafter described. It can be seen as shaft 154 is rotated, the worm gear 150 is rotated thereby moving the segment 110 throughout its arc. This moves the arm 112 of bell crank 120 which in turn moves the actuating link 90 through arm 116. The translation of actuating link 90 pivots link 71 about its pivotal mounting between brackets 73 which in turn changes the position of the forward pivoted end of the external flap 70. This movement of the forward end of the external flap 70 pivots flap 60 about its forward pivotal mounting and changes the exit area of the nozzle. Since the throat area remains the same, it can be seen that this movement by link 90 changes the ratio between the throat area and the exit area of the nozzle.

So that all of the worm gears 150, located around the inner side of the annular extension 23, are rotated together, the shafts 154 of adjacent actuating devices 96 having a shaft section 158 connected therebetween to provide for a synchronized movement. Each end of the shaft section 158 has one part of a spherical joint connection 156 which connects with the mating part on cooperating shaft 154 to form complete spherical joints. It can be seen now that as one shaft section 158 is rotated all of the shafts 154 and shaft sections 158 will rotate around the entire circumference of the nozzle. A gear 160 is mounted on one shaft section 158 and its outer portion extends through an opening in the annular extension 23. A worm gear 162 is mounted on fixed structure externally of the annular extension 23 and is rotatable by an actuating device not shown. Any actuating means desired can be used, for example an air motor connected to the worm gear 162 by a flexible shaft. This actuating device could be manually controlled for direct movement, or automatically controlled by some engine operating parameter such as altitude to achieve the proper setting.

Shaft section 158 is formed having two sections with a splined connection 166 therebetween. This connection permits for thermal changes in the nozzle which alter the size of the parts. The shaft section 158 having the gear 160 thereon is supported by brackets 176 to keep the gear 160 positioned in proper alignment with the one gear 162.

In a design having the system disclosed herein, an automatic control was used which provided for positive positioning of the divergent flaps for low exit area to throat area ratios below Mach 1.1 and high ratios above Mach 1.1. A transition was provided between Mach 1.05 and Mach 1.15. In one design, the total axial travel of the external flap pivot required a movement of approximately one-third inch while in another design approximately one-half inch was required.

The use of the two worm gear drives provided a high overall gear reduction. This provides for a minimum actuating force necessary to move the forward ends of the flaps and firmly restrains the flaps against movement by forces against the flaps. A seal means for a nozzle such as disclosed herein is set forth in copending application Ser. No. 210,017, Filed Dec. 20, 1971, for Seal Centering And Retention Means by Connie W. McMath.

I claim:

1. In combination with jet engine fixed structure, an exhaust nozzle mounted on said fixed structure, said nozzle comprising a circumferential row of first main flaps pivotally mounted on said fixed structure for controlling the flow area therethrough, first actuating means for pivotally moving said first main flaps, second divergent flaps, each of said second divergent flaps having its forward and pivotally mounted to the rearward end of a first main flap, third connecting means connecting each second divergent flap rearwardly of its forward end to said fixed structure, first means pivotally connecting the rear end of each third connecting means to its cooperating second divergent flap, and means pivotally connecting the forward end of each third connecting means to said fixed structure, and second actuating means for variably positioning the pivotal connection of the forward end of each third connecting means, movement of the pivotal connection varying the exit area of the second divergent flaps while the exit area of the first main flaps remains the same, said means pivotally connecting the forward end of each third connecting means to said fixed structure includes a guide link pivotally mounted to the forward end of each third connecting means and pivotally mounted at a point inwardly therefrom to said fixed structure.

2. A combination as set forth in claim 1 wherein said second actuating means includes a translatable link having one end connected to rotate said guide link about its pivotal mounting on said fixed structure thereby moving the cooperating flap.

3. A combination as set forth in claim 2 wherein said second actuating means comprises a bell crank pivotally mounted on said fixed structure and having one end fixed to said translatable link, the other end of said bell crank having a gear segment thereon, each gear segment being actuated by a worm gear rotatably mounted to said fixed structure.

4. A combination as set forth in claim 3 wherein each worm gear is mounted on first shaft means which are mounted for rotation adjacent each end of the worm gear, and second shaft means interconnecting all of said first shaft means so that said worm gears will move in unison.

5. A combination as set forth in claim 4 wherein said second shaft means is formed of two parts having splined engagement which will permit for axial growth of said shaft means so that thermal changes can be compensated for.

6. A combination as set forth in claim 4 wherein a drive gear is mounted on one of said second shaft means, said drive gear being rotatable by an actuating device for placing the pivotal connection of the forward end of each third connecting means between a forward and rearward position, said forward position placing said second divergent flaps at their maximum opening area for a given throat area and said rearward position placing said second divergent flaps at their minimum opening area for a given throat area.

7. A combination as set forth in claim 6 wherein said actuating device is controlled by an engine operating parameter.

8. A combination as set forth in claim 7 wherein said engine operating parameter is Mach number, said actuating device positioning said pivotal connection rearwardly for low Mach numbers and positioning said pivotal connection forwardly for high Mach numbers.

* * * * *